(12) United States Patent
Mosnier et al.

(10) Patent No.: US 10,919,342 B2
(45) Date of Patent: Feb. 16, 2021

(54) TIRE WITH A DIRECTIONAL TREAD COMPRISING CURVED BLOCKS WITH INCISIONS

(71) Applicant: COMPAGNIE GENERALE DES ETABLISSEMENTS MICHELIN, Clermon-Ferrand (FR)

(72) Inventors: David Mosnier, Clermont-Ferrand (FR); Michel Montarras, Clermont-Ferrand (FR); Yann Hye, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 637 days.

(21) Appl. No.: 15/551,823

(22) PCT Filed: Feb. 12, 2016

(86) PCT No.: PCT/EP2016/053045
§ 371 (c)(1),
(2) Date: Aug. 17, 2017

(87) PCT Pub. No.: WO2016/134990
PCT Pub. Date: Sep. 1, 2016

(65) Prior Publication Data
US 2018/0022163 A1   Jan. 25, 2018

(30) Foreign Application Priority Data
Feb. 27, 2015   (FR) .................................... 15 00393

(51) Int. Cl.
*B60C 11/12* (2006.01)
*B60C 11/03* (2006.01)
*B60C 11/11* (2006.01)

(52) U.S. Cl.
CPC ...... *B60C 11/0302* (2013.01); *B60C 11/0306* (2013.01); *B60C 11/0309* (2013.01);
(Continued)

(58) Field of Classification Search
CPC ............. B60C 11/0302; B60C 11/1204; B60C 11/1236; B60C 11/0306; B60C 11/0309;
(Continued)

(56) References Cited

U.S. PATENT DOCUMENTS 4,057,089 A    11/1977 Johannsen
5,733,393 A *   3/1998 Hubbell .................. B60C 11/00
                                                  152/154.2
(Continued)

FOREIGN PATENT DOCUMENTS

EP    2 769 856    8/2014
FR    2 291 879    6/1976
(Continued)

OTHER PUBLICATIONS

Machine translation of JP01-095912 (no date).*

*Primary Examiner* — Steven D Maki
*Assistant Examiner* — Philip N Schwartz
(74) *Attorney, Agent, or Firm* — Cozen O'Connor

(57) ABSTRACT

Tire comprising a directional tread that has two edges and a center. The tread comprises a plurality of blocks, each block extending continuously along an overall curvature C from one of the edges towards the center of the tread, forming a block central end provided with a central wall. Each block has a width WB and a length LB, this width increasing from the block central end in the direction of the edge. All or some of the blocks of the tread include a median sipe of length S and extending from the block central end along a curvature C' substantially identical to the curvature C of the block.

16 Claims, 2 Drawing Sheets

(52) U.S. Cl.
CPC ........... *B60C 11/11* (2013.01); *B60C 11/1204*
(2013.01); *B60C 11/1236* (2013.01); *B60C*
*2011/1254* (2013.01)

(58) Field of Classification Search
CPC ................ B60C 11/11; B60C 11/0311; B60C
2011/1255; B60C 2011/1254
See application file for complete search history.

(56) References Cited

U.S. PATENT DOCUMENTS

| | | | | |
|---|---|---|---|---|
| 5,824,169 | A * | 10/1998 | Landers | B60C 11/0302 |
| | | | | 152/209.1 |
| 6,050,313 | A * | 4/2000 | Tsuda | B60C 11/12 |
| | | | | 152/209.18 |
| D718,224 | S * | 11/2014 | Guichon | D12/563 |
| 1,127,517 | A1 | 2/2015 | Richardson | |
| 2013/0206298 | A1* | 8/2013 | Guillermou | B60C 11/12 |
| | | | | 152/209.18 |
| 2014/0251519 | A1* | 9/2014 | Piffard | B60C 11/0318 |
| | | | | 152/209.5 |

FOREIGN PATENT DOCUMENTS

| | | | | |
|---|---|---|---|---|
| GB | 2 240 522 | | 8/1991 | |
| JP | 01095912 A | * | 4/1989 | ............ B60C 11/04 |
| JP | 2010254252 A | * | 11/2010 | ............ B60C 11/04 |
| WO | WO 2013/048682 | | 4/2013 | |

\* cited by examiner

TIRE WITH A DIRECTIONAL TREAD COMPRISING CURVED BLOCKS WITH INCISIONS

RELATED APPLICATIONS

This is a U.S. National Phase Application under 35 USC 371 of International Application PCT/EP2016/053045 filed on Feb. 12, 2016.

This application claims the priority of French application no. 1500393 filed Feb. 27, 2015, the entire content of which is hereby incorporated by reference.

TECHNICAL FIELD OF THE INVENTION

The present invention relates to a tire provided with a directional tread that is suitable for wintry conditions involving for example roads covered with ice and/or snow, the tread being provided with a plurality of blocks in the form of curves aligned along the tread.

PRIOR ART

The document U.S. Pat. No. 4,057,089 describes a tire comprising a tread provided with a plurality of blocks. Each of these blocks is arranged in a curved shape and extends from the centre of the tread to one of the edges. Some blocks are arranged in the shape of a curve in the form of a second degree parabola. The blocks are connected to a central strip. Since the blocks are relatively wide, the stiffness of these same blocks is consequently high, with the result that the tread rapidly becomes worn.

The document WO2013/048682 relates generally to tires of which the treads have a configuration and/or properties suited to conditions of snow-covered ground, but also suitable for dry ground. More specifically, the document describes a tire having a tread with a high density of lamellae in the contact zone, a reliable density of lateral grooves, and a minimum value for the longitudinal contact area ratio. These features provide the tire with a good compromise between the braking characteristics on snow-covered ground and those on dry ground. However, from a point of view of continuous improvement in the performance level of tires, designers are seeking even better solutions, in particular with regard to the performance on snow-covered ground.

The invention provides various technical means for remedying these various drawbacks.

SUMMARY OF THE INVENTION

First of all, a first object of the invention consists in providing a tire tread that makes it possible to improve the durability of a tread provided with blocks configured with curved profiles.

Another object of the invention consists in providing a tread that makes it possible to obtain an excellent compromise between grip on snow-covered ground and grip on wet ground, while maintaining the performance on dry ground.

To this end, one aspect of the invention provides a tire comprising a directional tread, said tread comprising two edges and a centre, this tread comprising a plurality of blocks, each block extending continuously along an overall curvature C from one of the edges towards the centre of said tread, forming a block central end, each block having a width WB and a length LB, this width increasing from the block central end in the direction of the edge, all or some of the blocks of the tread comprising a median sipe of length S, said median sipe extending along a curvature C' substantially identical to the curvature C of the block. According to the invention, the length S of the median sipe is determined such that $0.5 \cdot LB \leq S \leq 0.8 \cdot LB$, and all or some of the blocks of the tread comprise a lateral sipe that is arranged in continuation of the median sipe and is decoupled from said median sipe.

This lateral sipe allows an increase in the number of corners in the shoulder zone and consequently improves braking and driveability on snow-covered roads. Decoupling between the lateral sipe and the median sipe makes it possible to locally increase the stiffness of the block that comprises these sipes.

Advantageously, the median sipe extends from the block central end. This arrangement improves grip on snow-covered ground more specifically in the central zone of the tread.

Likewise advantageously, the lateral sipe widens from a certain depth in the tread, forming a sipe widening, said sipe widening opening onto the shoulder of the tire, beyond the edge of the tread.

This sipe widening makes it possible to extend the favourable characteristics of grip on snow-covered ground in spite of the wear to the blocks, down for example to a block height of around 3 mm. Furthermore, the droplet-shaped profile makes it possible to store water and promotes the performance on wet ground.

Advantageously, the curvature C' of the median sipe is determined such that the projection ratio Sx/Sy corresponds to $0.5 \leq Sx/Sy \leq 1.25$, where Sx denotes the projection of the length S of the sipe along a circumferential axis X of the tread and Sy denotes the projection of this length S along a transverse axis Y of the tread.

Such an arrangement makes it possible to obtain an advantageous compromise between the characteristics of grip on snow-covered ground and grip on wet ground without a loss of performance for braking on dry ground. This improvement is due to the coupled effect of the corners created by the sipes and the orientations thereof which have a frictional effect on the snow and thus improve grip. The presence of the sipe and the orientation thereof make it possible to improve the grip on snow-covered ground on account of the corners. Furthermore, the sipe interruption zone makes it possible to increase the stiffness along the axis X and to improve braking on dry ground.

This tire is advantageously provided for all-season use.

According to one advantageous embodiment, all or some of the blocks of the tread comprise a generally circumferential sipe arranged at the opposite end of the median sipe from the block central end, said generally circumferential sipe extending from one edge of the block to the other.

This circumferential sipe promotes the transverse flattening of the tire. Stiffness in the shoulder zone is maintained, however, in order to allow good road holding on cornering.

According to one advantageous embodiment, the circumferential sipe is V-shaped, with the tip being at an angle α of between 100° and 170° and preferably between 150° and 170°. In a variant, the circumferential sipe is in the overall shape of an "S". In another variant, this sipe may comprise several small segments while maintaining a generally circumferential orientation.

Advantageously, the blocks comprise three zones: a central zone at an angle β1 with respect to the transverse direction (Y) such that $35° \leq \beta 1 \leq 65°$, an edge zone at an angle β3 with respect to the transverse direction (Y) such that $0° \leq \beta3 \leq 10°$, and an intermediate zone between the central zone and the edge zone at an angle β2 for continuity between the three zones.

According to one advantageous embodiment, at least some of the median sipes comprise a sipe chamfer. The sipe chamfer is advantageously located in the intermediate zone of the block. In a variant, it extends as far as the generally circumferential sipe. This arrangement makes it possible to improve braking on dry ground.

According to another advantageous embodiment, at least some of the blocks are designed with a block chamfer provided at the trailing edge in the intermediate zone and/or the edge zone, the central zone not having a chamfer.

This arrangement likewise makes it possible to improve braking on dry ground.

Preferably, these chamfers are 45°-chamfers with a section of between 1×1 mm and 2×2 mm. They can also be formed by a radius (1 to 2 mm) joined to the faces of the blocks.

According to another advantageous embodiment, at least some of the median sipes comprise stiffening means which connect, for each sipe, the opposite faces of this sipe. The stiffening means are particularly advantageous in the central zone, this zone having the greatest angle with respect to the transverse direction (Y).

The stiffening means are preferably arranged in the sipe at spacings of 5 to 20 mm. The height of the stiffening means is preferably between 40 and 80% of the maximum height of the sipes. Therefore, these stiffening means do not extend as far as the surface of the tread when the tire is new.

Advantageously, in at least one sipe, the spacing between the stiffening means is variable.

Likewise advantageously, the stiffening means are integral with the tread.

Likewise advantageously, the blocks are made up of an elastomer composition based on a diene elastomer, a plasticizing system and an interlinking system, wherein the elastomer composition has a glass transition temperature of between −40° C. and −15° C. and a shear modulus G* measured at 60° C. of between 0.5 MPa and 1.1 MPa.

Such a composition allows use under wintry conditions with very cold temperatures without deterioration of the performance.

Furthermore, the Applicants have found, surprisingly, that the tread according to the invention, with an overall appearance of the blocks resembling a summer-type tire, has behavioural characteristics that are particularly advantageous on snow-covered and/or icy ground. The limits of this performance are favourably pushed back further with the use of the above-described compositions.

Furthermore, advantageous improvements in performance are observed when the glass transition temperature of the elastomer composition is between −20° C. and −30° C.

The shear modulus G* is preferably between 0.9 MPa and 1 MPa.

BRIEF DESCRIPTION OF THE DRAWINGS

Embodiment details are given in the description which follows, which is supplemented by FIGS. 1 to 4, which are given solely by way of non-limiting examples and in which.

DETAILED DESCRIPTION OF THE DRAWINGS

Figure 1:
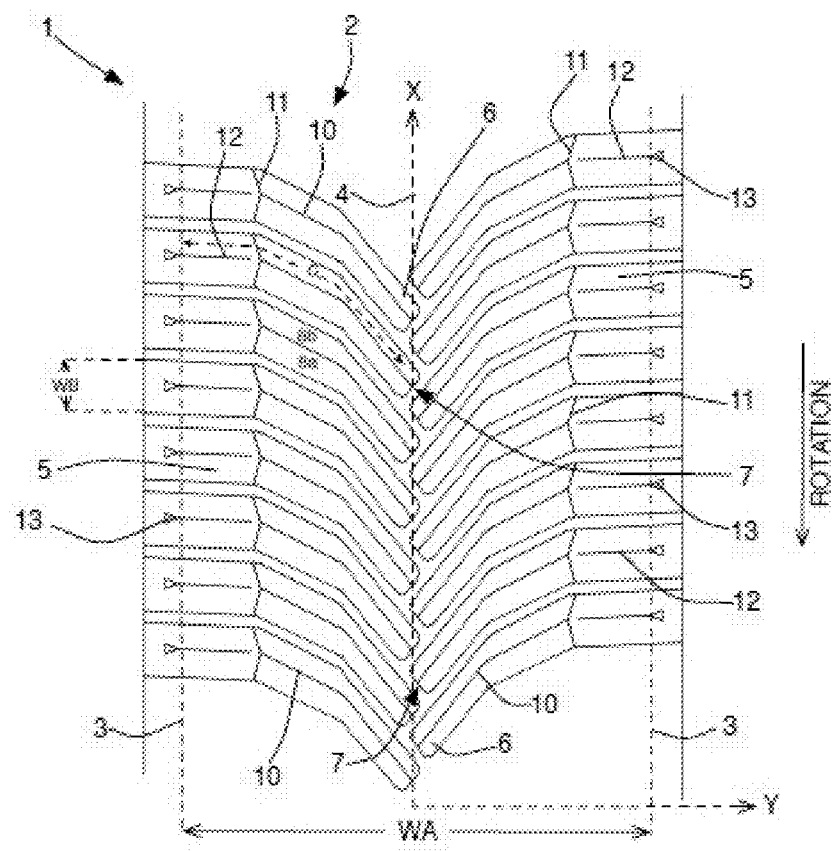
FIG. 1 is a schematic depiction of a portion of a tread corresponding substantially to the contact patch.

In the present document, curved length "L" or "S" means a length measured taking the curvature of the "L"- or "S"-shaped element measured into account.

A "directional tread pattern" means a tread pattern in which the tread pattern elements are specifically arranged to optimize the behavioural characteristics depending on a predetermined sense of rotation. This sense of rotation is conventionally indicated by an arrow on the sidewall of the tire. In such an architecture, the edges of the tread pattern elements which face in the rolling direction are denoted by the term "leading edge", while the edges of the tread pattern elements which face away from the rolling direction are denoted by the term "trailing edge". In addition, a "directional tread pattern" is a tread pattern that implies a preferred rolling sense such that, when the tire is rotated in said preferred sense, this tire affords properties of grip on the ground that are better than those afforded when said tire is rotated in the other sense. A directional tread pattern is for example a tread pattern having patterns in the overall shape of a V.

A "sipe" means an elongate and thin (between 0.1 and 2 mm) slit or cutout made in a tread block.

"median sipe in the block" means that this median sipe separates this block into two generally identical block parts. Since the difference in area between these two block parts is less than 10%, the area is understood to mean that which can come into contact with the ground in the contact patch.

A "lateral sipe" means a sipe which extends generally in the transverse direction Y, the angle formed by the direction of extension of this sipe with the transverse direction Y being less than 15 degrees in absolute terms.

A "lateral sipe decoupled from the median sipe" means that there is an area of rubber between the lateral sipe and the median sipe. The length of this area of rubber is at least 2 mm.

A "circumferential sipe" means a sipe which extends generally in the circumferential direction X, the angle formed by the direction of extension of this sipe with the circumferential direction X being less than or equal to 20 degrees in absolute terms.

The expression "each block extending continuously from one edge 3 towards the centre 4" means that the block is not interrupted by separating grooves that separate this block into different sub-blocks. A groove means a cutout, the material faces of which do not touch under normal rolling conditions. The width of a groove is greater than or equal to 2 mm. Thus, the fact that these blocks are not interrupted by separating grooves makes it possible to improve the evacuation of water from the centre 4 towards the edge 3, the presence of such separating grooves being able to disrupt the flow of water towards the outside of the tire.

The expression "overall curvature C of the block" means that the block has a curved shape. This curvature can be constant or continuously variable. In another variant, the curvature is formed by a succession of segments.

The expression "overall curvature C' of the median sipe" means that the median sipe follows a curved line. This curvature can be constant or continuously variable. In another variant, the curvature is formed by a succession of segments.

A "tread" means the region of the tire of which at least a part is made to come into contact with the ground and is worn away by this contact with the ground.

FIG. 1 illustrates substantially the contact patch of a tread 2 of a tire 1. The contact patch has a maximum width WA that is defined by the ETRTO standard and illustrated in FIG. 1 between the dotted lines delimited by the width WA. The ETRTO standard provides a width WA=(1.075−0.005ar) *$S^{1.001}$ where "ar" is the nominal aspect ratio and S is the theoretical section width on the measuring rim. The edges 3 of the tread correspond to the dotted lines delimiting the width WA.

According to the invention, the tread 2 comprises a plurality of blocks 5. Each of the blocks extends from one edge 3 of the tread towards the central axis 4 of the tread, generally following a curvature C. The expression "towards the centre" means in this case that the block ends in the region of the centre, or just before the centre or just after the centre. The centre 4 is defined by a line that extends in the circumferential direction and divides the tread into two halves. For wide tire sizes, a longitudinal furrow can be added at this centre 4.

Figure 2:
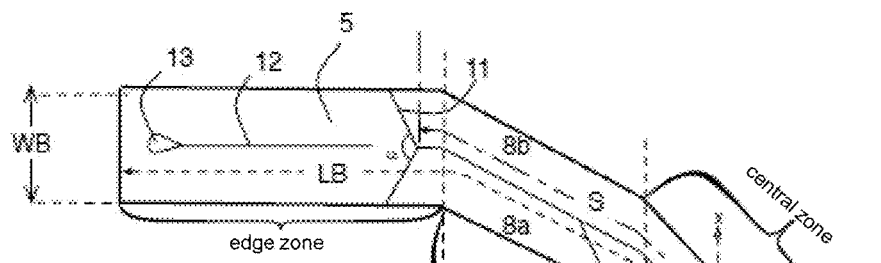
FIG. 2 is a schematic depiction of a block for a tread such as the one in FIG. 1.
Figure 3:
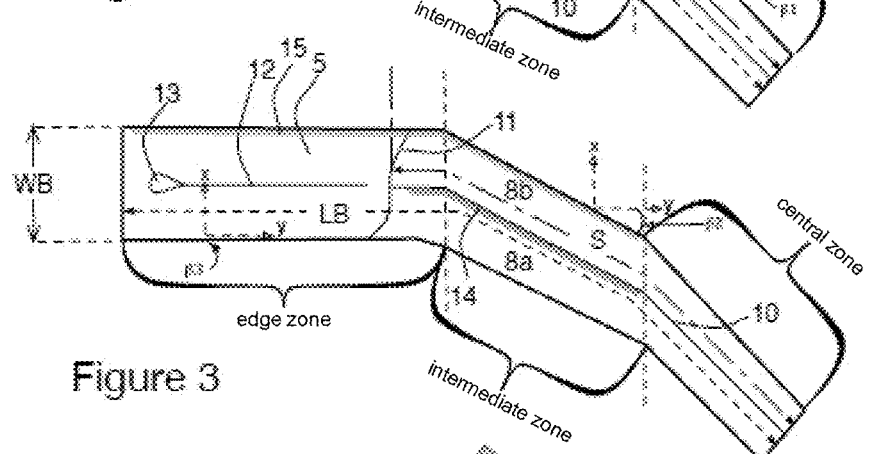
FIG. 3 shows a variant embodiment of the block in FIG. 2.

Each of the blocks has a length LB and a width WB, this width increasing from the block central end in the direction of the edge 3. The blocks are advantageously configured in three zones, namely a central zone, an intermediate zone and an edge zone. The central zone makes an angle β1 of between 35° and 65° and more preferably around 50°+−5° with respect to the transverse direction (Y). At the periphery of the blocks, there is the edge zone that makes an angle β3 of between 0° and 10° with respect to the transverse direction (Y). In order to ensure a continuous connection between these two zones, the intermediate zone is provided. This intermediate zone makes it possible to ensure the connection between the central zone and the edge zone with an angle β2 allowing continuity between the three zones. On account of this arrangement in three zones, the blocks have a curvature C, which is progressive from the edge 3 in the direction of the centre 4. In order to shape this curvature, the sides of the blocks form, depending on the case, either a continuous curved line from the edges 3 towards the centre 4, this curvature being able to be variable, or a plurality of angled segments, as shown in FIGS. 2 and 3. In the case in which a block zone is configured by a succession of segments, the angle β is the mean angle. In the case in which a block zone is configured by a curved segment, the angle β corresponds to the mean of the angles along the curvature.

At least some of the blocks 5 comprise a median sipe 10 that extends along the block along a curvature C' similar to the curvature C of the block. This sipe makes it possible to separate the block into two parts 8a and 8b, with preferably substantially identical volumes. In a variant, only some of the blocks 5 comprise a median sipe 10.

The median sipe 10 makes it possible to reduce the stiffness of the block 5, separating it into two half-blocks. The stiffness of each half-block is substantially identical, helping to make the wearing of these two half-blocks uniform. The median sipe 10 has a curved length S. This length S of the median sipe is preferably determined such that $0.5 \cdot L \leq S \leq 0.8 \cdot L$.

According to the invention, at least some of the blocks 5 comprise a generally circumferential sipe 11 arranged at the end of the median sipe 10. The expression "generally circumferential" means an arrangement such that the projection ratio Ry/Rx corresponds to 0≤Ry/Rx≤0.6. This sipe produces a decoupling effect that promotes the flattening of the tire.

The examples in FIGS. 1 and 2 illustrate V-shaped generally circumferential sipes 11, the tip of the V of which makes an angle α of between 100° and 170° and preferably between 150° and 170°. Depending on the embodiment, the tip of the V can be oriented either towards the centre of the tread or towards the proximal edge of the tread. A V-shaped sipe makes it possible to improve grip in the longitudinal and transverse directions.

The exemplary embodiment in FIG. 3 shows a block 5, the generally circumferential sipe 11 of which is "S"-shaped. The profile formed is sufficiently stretched out for the sipe to meet the criterion according to which the projection ratio Ry/Rx is between 0 and 0.6.

Finally, the blocks 5 provide at least one lateral sipe 12, which is arranged in the block edge zone. This sipe is offset transversely with respect to the median sipe 10 and the circumferential sipe 11. The offset between this sipe and the other sipes is preferably between 3 and 6 mm. This offset, by locally increasing the stiffness, helps to improve the braking effectiveness on dry ground.

Preferably, this lateral sipe 12 widens from a certain tread pattern depth, forming a sipe widening 13. This sipe widening 13 opens onto the shoulder of the tire and forms a droplet-shaped profile.

Advantageously, the sipes 10 and 12 are arranged at the neutral fibre of the blocks, that is to say so as to separate the blocks into two parts with substantially identical volumes.

The depth of the sipes is preferably between 85% and 105% of the depth of the grooves delimiting the blocks.

FIG. 3 likewise shows a sipe chamfer 14 provided on the median sipe 10. In the example illustrated, the sipe chamfer 14 extends along the intermediate zone, and then slightly beyond this zone over a contiguous portion of the edge zone, substantially as far as the generally circumferential sipe 11.

A block chamfer 15 situated at the trailing edge of the edge zone and of the intermediate zone is also shown.

On account of their small inclination with respect to the transverse direction Y, the edge zone and the intermediate zone are more susceptible to the rocking phenomenon in the event of high braking stresses. This stress causes overpressure at the corner of the trailing edge, and this has a disadvantageous effect on braking under certain conditions. The presence of the above-described chamfers makes it possible to alleviate, or even eliminate, this phenomenon.

The presence of chamfers on too many corners has the effect of reducing the volume of material to be worn away and of increasing the surface void ratio, with a negative impact on the noise output by the tire. In order to avoid these drawbacks, the central zone, which is most inclined, does not have chamfers. This judicious distribution of the chamfers makes it possible to limit their use to the zones in which they are most effective.

Figure 4:
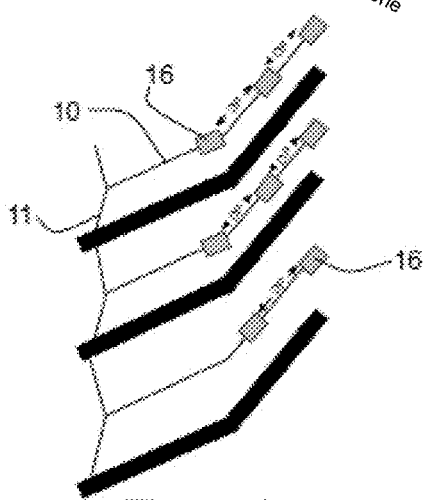
FIG. 4 is a partial schematic depiction of a variant embodiment of the tread in FIG. 1, with bridges arranged along the sipes.

FIG. 4 illustrates a variant embodiment comprising stiffening means 16 such as bridges arranged at certain positions along the median sipe 10. These bridges make it possible to greatly reduce the retention of stones in the sipes. Furthermore, it has been found that a spacing DP of between 15 mm and 20 mm between the bridges 16 makes it possible to optimize this non-retention effect, without affecting the effectiveness of the lamellae on snowy ground. According to the embodiments envisaged, this type of arrangement makes it possible to provide sipes having a length of around 70 mm.

The blocks of the tread are made up of an elastomer composition based on a diene elastomer, a plasticizing system and an interlinking system, wherein the elastomer composition has a glass transition temperature of between −40° C. and −15° C. and a shear modulus G* measured at 60° C. of between 0.5 MPa and 1.1 MPa.

The diene elastomer is selected from the group comprising natural rubber, stirene-butadiene rubber, synthetic polyisoprene rubber, polybutadiene rubber and any combinations of these constituents. The plasticizing system comprises plasticizers selected from a plasticizing oil, a plasticizing resin or any combination of these constituents.

The plasticizing resin is a polylimonene resin. The plasticizing oil is selected from a petroleum-based oil, a vegetable oil, or any combination of these oils.

The figures and their descriptions given above illustrate the invention rather than limit it. In particular, the invention and the different variants thereof have just been described in relation to a particular example comprising identical blocks over the entire surface of the tread.

However, it is obvious to a person skilled in the art that the invention can be extended to other embodiments in which, in variants, non-identical blocks are provided either along the circumferential alignment or on either side of the central line of the tread. It is also possible to provide for at least one of the ends of the median sipes 10 to comprise a bridge in the central part of the tread and/or between the median sipe and the circumferential sipe.

The reference signs in the claims are entirely non-limiting. The verbs "comprise" and "have" do not exclude the presence of elements other than those listed in the claims.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire comprising a directional tread, said tread comprising two edges and a centre, said tread comprising a plurality of blocks, each said block extending continuously along an overall curvature C from one of the edges towards the centre of said tread, forming a block central end, each said block having a width WB and a length LB, said width increasing from the block central end in the direction of the edge, all or some of the blocks of the tread comprising a median sipe of length S, said median sipe extending along a curvature C' substantially identical to the curvature C of the block, wherein the length S of the median sipe is determined such that 0.5·LB≤S≤0.8·LB, and wherein all or some of the blocks of the tread comprise a lateral sipe that is arranged in continuation of the median sipe and is decoupled from said median sipe, wherein all or some of the blocks of the tread comprise a V-shaped circumferential sipe having a point of the V arranged at an opposite end of the median sipe from the block central end, said V-shaped circumferential sipe extending from one edge of the block to the other, and wherein the lateral sipe continues from the median sipe at a circumferential level of the point of the V of the V-shaped circumferential sipe.

2. The tire according to claim 1, wherein the median sipe extends from the block central end.

3. The tire according to claim 1, wherein the lateral sipe widens from a certain depth in the tread, forming a sipe widening, said sipe widening opening onto the shoulder of the tire, beyond the edge of the tread.

4. The tire according to claim 1, wherein the tip of the V of the V-shaped circumferential sipe is at an angle α of between 100° and 170°.

5. The tire according to claim 1, wherein the blocks comprise at least three zones: a central zone at an angle β1 with respect to the transverse direction such that 35°≤β1≤65°, an edge zone at an angle β3 such that 0°≤β3≤10°, and an intermediate zone between the central zone and the edge zone at an angle β2 for continuity between the three zones.

6. The tire according to claim 1, wherein at least some of the median sipes comprise a sipe chamfer.

7. The tire according to claim 6, wherein the sipe chamfer is located in the intermediate zone of the block.

8. The tire according to claim 1, wherein at least some of the blocks have a block chamfer provided at the trailing edge in the intermediate zone and/or the edge zone, the central zone not having a chamfer.

9. The tire according to claim 1, wherein at least some of the median sipes comprise stiffening means which connect, for each sipe, the opposite faces of this sipe.

10. The tire according to claim 9, wherein the stiffening means are arranged in the sipe at spacings of 5 to 20 mm.

11. The tire according to claim 9, wherein, in at least one sipe, the spacing between the stiffening means is variable.

12. The tire according to claim 9, wherein the stiffening means are integral with the tread.

13. The tire according to claim 1, wherein the blocks are comprised of an elastomer composition based on a diene elastomer, a plasticizing system and an interlinking system, wherein the elastomer composition has a glass transition temperature of between −40° C. and −15° C. and a shear modulus G* measured at 60° C. of between 0.5 MPa and 1.1 MPa.

14. The tire according to claim 13, wherein the glass transition temperature of the elastomer composition is between −20° C. and −30° C.

15. The tire according to claim 13, wherein the shear modulus G* is between 0.9 MPa and 1 MPa.

16. The tire according to claim 1, wherein the tip of the V of the V-shaped circumferential sipe is at an angle α of between 150° and 170°.

* * * * *